US008893007B2

(12) United States Patent
Vadde et al.

(10) Patent No.: US 8,893,007 B2
(45) Date of Patent: Nov. 18, 2014

(54) MANAGING NETWORK USAGE PER APPLICATION VIA POLICIES

(75) Inventors: Kiran Kumar Vadde, Sammamish, WA (US); Kevin A Chin, Bellevue, WA (US); Harish Srinivasan, Sammamish, WA (US); Omar M. Maabreh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 157 days.

(21) Appl. No.: 12/942,423

(22) Filed: Nov. 9, 2010

(65) Prior Publication Data

US 2012/0117478 A1 May 10, 2012

(51) Int. Cl.
G06F 15/177 (2006.01)
G06F 15/173 (2006.01)
H04L 12/819 (2013.01)
H04L 12/801 (2013.01)
G06F 9/54 (2006.01)

(52) U.S. Cl.
CPC ............... *G06F 9/54* (2013.01); *H04L 47/215* (2013.01); *H04L 47/19* (2013.01)
USPC ........................... 715/736; 709/225; 709/226

(58) Field of Classification Search
USPC ....................................................... 715/736
See application file for complete search history.

(56) References Cited

U.S. PATENT DOCUMENTS

| 7,650,227 | B2 | 1/2010 | Kirk et al. | |
|---|---|---|---|---|
| 2007/0121869 | A1 | 5/2007 | Gorti et al. | |
| 2008/0242279 | A1 | 10/2008 | Ramer et al. | |
| 2009/0055467 | A1* | 2/2009 | Petersen | 709/203 |
| 2009/0116431 | A1* | 5/2009 | Cadieux | 370/329 |
| 2009/0181665 | A1* | 7/2009 | Sater et al. | 455/424 |
| 2009/0234711 | A1 | 9/2009 | Ramer et al. | |
| 2010/0058168 | A1* | 3/2010 | Gibb et al. | 715/234 |
| 2010/0070350 | A1 | 3/2010 | Paunikar et al. | |
| 2010/0115582 | A1 | 5/2010 | Sapp et al. | |
| 2010/0145643 | A1* | 6/2010 | Katpelly et al. | 702/63 |
| 2010/0185677 | A1 | 7/2010 | Gupta et al. | |
| 2010/0235121 | A1* | 9/2010 | Constien et al. | 702/63 |
| 2011/0219118 | A1* | 9/2011 | Cowan et al. | 709/224 |
| 2011/0276442 | A1* | 11/2011 | Momtahan et al. | 705/30 |
| 2011/0320307 | A1* | 12/2011 | Mehta et al. | 705/26.7 |
| 2012/0047379 | A1* | 2/2012 | Chen et al. | 713/320 |

OTHER PUBLICATIONS

Tutschku, K., "Demand-based Radio Network Planning of Cellular Mobile Communication Systems", Retrieved at <<http://citeseerx.ist.psu.edu/viewdoc/download?doi=10.1.1.7.1151&rep=rep1&type=pdf >>, INFOCOM '98. Seventeenth Annual Joint Conference of the IEEE Computer and Communications Societies. Proceedings. IEEE, Mar. 29-Apr. 2, 1998, pp. 1-23.

* cited by examiner

*Primary Examiner* — Alvin Tan
*Assistant Examiner* — Xuyang Xia
(74) *Attorney, Agent, or Firm* — John Jardine; Kate Drakos; Micky Minhas (57) ABSTRACT

Defining and applying policies to manage data traffic including data transmitted and/or received by each of a plurality of applications executing on a computing device. The data traffic is monitored per application and attributes are defined for the monitored data traffic to enable the user to evaluate the data traffic for each application. Usage patterns are determined based on the monitored data traffic and the attributes to create one or more policies. The policies are applied to prevent each application from exceeding a corresponding data usage limit defined by the policies.

20 Claims, 4 Drawing Sheets

MANAGING NETWORK USAGE PER APPLICATION VIA POLICIES

BACKGROUND

The cost of mobile operator data plans is often based on usage. Each data plan has data usage limits, but users have difficulty determining when the data usage limits have been reached or are about to be reached with existing systems. As a result, users can incur excess data charges. Further, with existing systems, users are unable to determine the relative costs incurred by different applications executing on a mobile telephone.

SUMMARY

Embodiments of the disclosure manage data traffic per application. Data transmitted and/or received by each of a plurality of applications executing on a computing device is monitored. One or more attributes associated with the monitored data are defined for each of the plurality of applications. Usage patterns for each of the plurality of applications are determined based at least on the monitored data and the defined attributes associated therewith. The determined usage patterns are provided to a user of the computing device for evaluation of each of the plurality of applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable data budgets to be invoked per application 110. In some embodiments, data traffic is monitored per application 110 along with attributes 112 such as time of day, location, type of network interface, and amount of data during an interval (e.g., month). Sample network interface types include cellular, wireless fidelity (WiFi), and the like. Usage patterns are developed that form the basis of policies 114 that are used to restrict data traffic per application 110 over specific networks, locations, times, and the like. The policies 114 may also be used to reduce battery usage, mobile operator charges, and/or processor usage by restricting data traffic. Further, aspects of the disclosure enable users 104 to save money on their monthly network operator bill (e.g., wireless bill).

Figure 1:
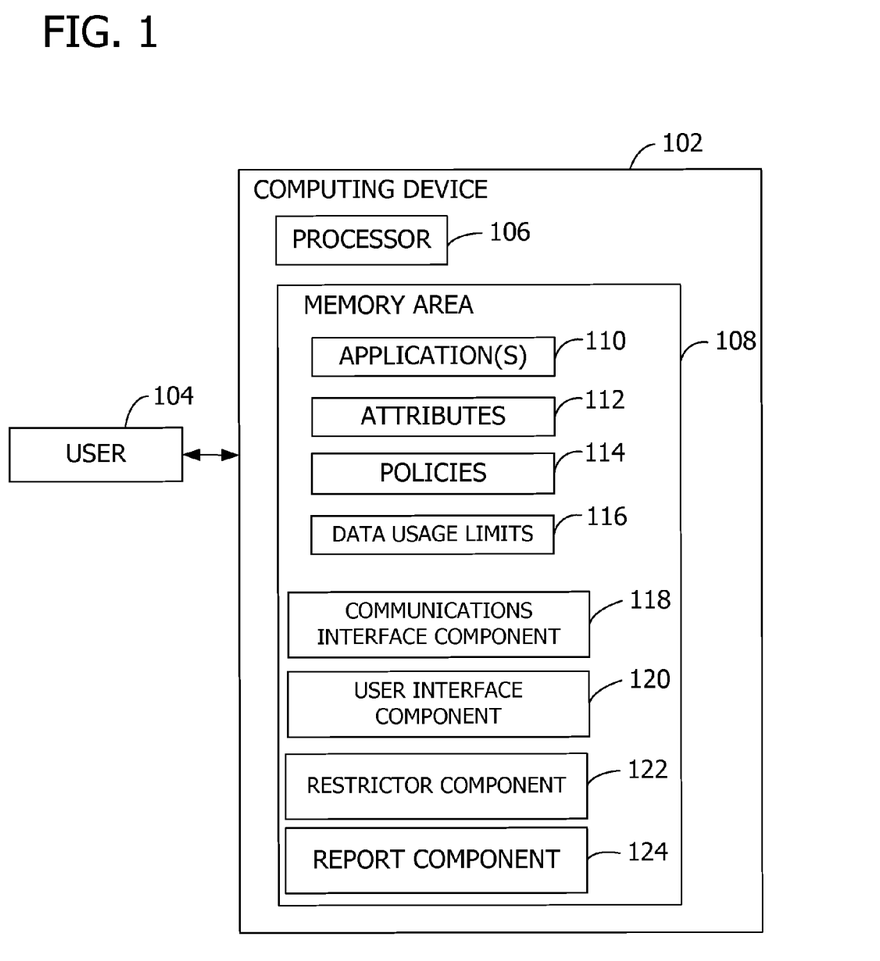
FIG. 1 is an exemplary block diagram illustrating a computing device storing policies for enforcing data usage limits of applications.

Referring again to FIG. 1, an exemplary block diagram illustrates a computing device 102 storing policies 114 for enforcing data usage limits 116 of applications 110. In the example of FIG. 1, the computing device 102 associated with the user 104 represents a system for managing data traffic per application 110. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 106 and a memory area 108. The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2 and FIG. 3).

The computing device 102 further has one or more computer-readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown).

The memory area 108 stores, among other data, one or more applications 110. The applications 110, when executed by the processor 106, operate to perform functionality on the computing device 102. Exemplary applications 110 include mail application programs, web browsers, calendar application programs, address book application programs, messaging programs, media applications, location-based services, search programs, and the like. The applications 110 may communicate with counterpart applications or services such as web services accessible via a network. For example, the applications 110 may represent downloaded client-side applications that correspond to server-side services executing in a cloud.

The memory area 108 further stores one or more attributes 112, policies 114, and data usage limits 116. As further described below, the attributes 112 represent characteristics of, or otherwise describe, data that is transmitted or received by the applications 110. Each of the applications 110 has a set of attributes 112 corresponding thereto. Exemplary attributes 112 include, but are not limited to, a transmission time, receipt time, duration, network interface type, port, location of the computing device 102, network operator, quantity of data sent, quantity of data received, application name, or permissions.

The policies 114 represent rules, limitations, qualifications, or other criteria for managing data transmitted and/or received by the applications 110. As further described below, the policies 114 are defined based on a plurality of inputs such as the attributes 112 and the data transmitted and/or received by the applications 110, and may apply to one or more of the applications 110.

The data usage limits 116 place restrictions on the quantity and/or type of data transmitted and/or received by each of the applications 110. In some embodiments, each of the applications 110 has one or more of the data usage limits 116 corresponding thereto.

The memory area 108 further stores one or more computer-executable components. Exemplary components include a communications interface component 118, a user interface component 120, a restrictor component 122, and a report component 124. The communications interface component 118, when executed by the processor 106 of the computing device 102, causes the processor 106 to provide a profile of the user 104 of the computing device 102 (e.g., a first computing device) to another computing device (e.g., a second computing device). The profile describes the user 104 and/or the first computing device, and may include, for example, a list of installed applications 110, operating system version, corporate affiliation (e.g., employment of the user 104), explicit preferences of the user 104, inferred preferences of the user 104, user activity history (e.g., browsing history, interaction with the first computing device), and the like.

The second computing device represents, for example, a server or other remote device that communicates with a plurality of first computing devices (such as computing device 102). The second computing device maintains, or has access to, a plurality of policies 114 such as data usage policies. In some embodiments, the second computing device collects the data usage policies (or usage patterns) from the plurality of first computing devices, and acts as a central repository to aggregate the data usage policies (or usage patterns). For example, the first computing devices create and share the data usage policies with the second computing device. In some embodiments, based on the received profile of the user 104, the second computing device selects one or more data usage policies. In this manner, users 104 with similar usage habits share the same data usage policies. Each of the data usage policies includes data usage limits 116. Each of the data usage limits 116 corresponds to at least one of the applications 110 executing on the first computing device. Alternatively or in addition, the data usage limits 116 correspond to application types (e.g., browser, email, search, location, etc.).

The communications interface component 118 further executes on the first computing device to receive the selected data usage policies from the second computing device. In some embodiments, the communications interface component 118 includes a network interface card and/or computer-executable instructions (e.g., a driver) for operating the network interface card.

The user interface component 120, when executed by the processor 106, causes the processor 106 to provide the data usage policies received by the communications interface component 118 to the user 104. For example, a list of the received data usage policies may be displayed to the user 104. The user interface component 120 further executes to receive from the user 104 a selection of at least one of the provided data usage policies. In some embodiments, the user 104 selects multiple data usage policies, and assigns each selected data usage policy to one or more of the applications 110. The user 104 may also identify applications 110 to which none of the data usage policies applies. In such embodiments, the identified applications 110 represent an exception list.

In some embodiments, the user interface component 120 includes a graphics card for displaying data to the user 104 and receiving data from the user 104. The user interface component 120 may also include computer-executable instructions (e.g., a driver) for operating the graphics card. Further, the user interface component 120 may include a display (e.g., a touch screen display) and/or computer-executable instructions (e.g., a driver) for operating the display. The user interface component 120 may also include one or more of the following to provide data to the user 104 or receive data from the user 104: speakers, a sound card, a camera, a microphone, a vibration motor, and one or more accelerometers. For example, the user 104 may input commands or manipulate data by moving the computing device 102 in a particular way.

The restrictor component 122, when executed by the processor 106, causes the processor 106 to apply the data usage policy selected by the user 104 via the user interface component 120 to one or more of the applications 110 executing on the first computing device. Applying the data usage policy prevents the applications 110 from transmitting and/or receiving data in excess of the data usage limits 116 associated with the applied data usage policy. Applying the data usage policy includes determining whether any of the criteria in the data usage policy has been violated. For example, the restrictor component 122 monitors the data transmitted and/or received by the applications 110 and determines whether the data usage limits 116 corresponding to each of the applications 110 have been exceeded or are about to be exceeded (e.g., within a percentage such as 80% of the maximum or absolute threshold). In some embodiments, the restrictor component 122 monitors the data by receiving or accessing the attributes 112 or other statistics describing the data transmitted and/or received by each of the applications 110.

The report component 124, when executed by the processor 106, causes the processor 106 to provide the user 104 with a data cost associated with each of the applications 110. The data cost is derived by correlating the amount and/or type of data traffic with a cost for handling the data traffic. The cost may be a financial cost that is set, for example, by a network operator (e.g., a mobile operator). Other costs are contemplated and include, for example, a resource cost corresponding to an amount of battery power consumed when handling the data traffic. In some embodiments, the report component 124 produces data (e.g., in chart form) that shows the data cost per application 110.

Figure 2:
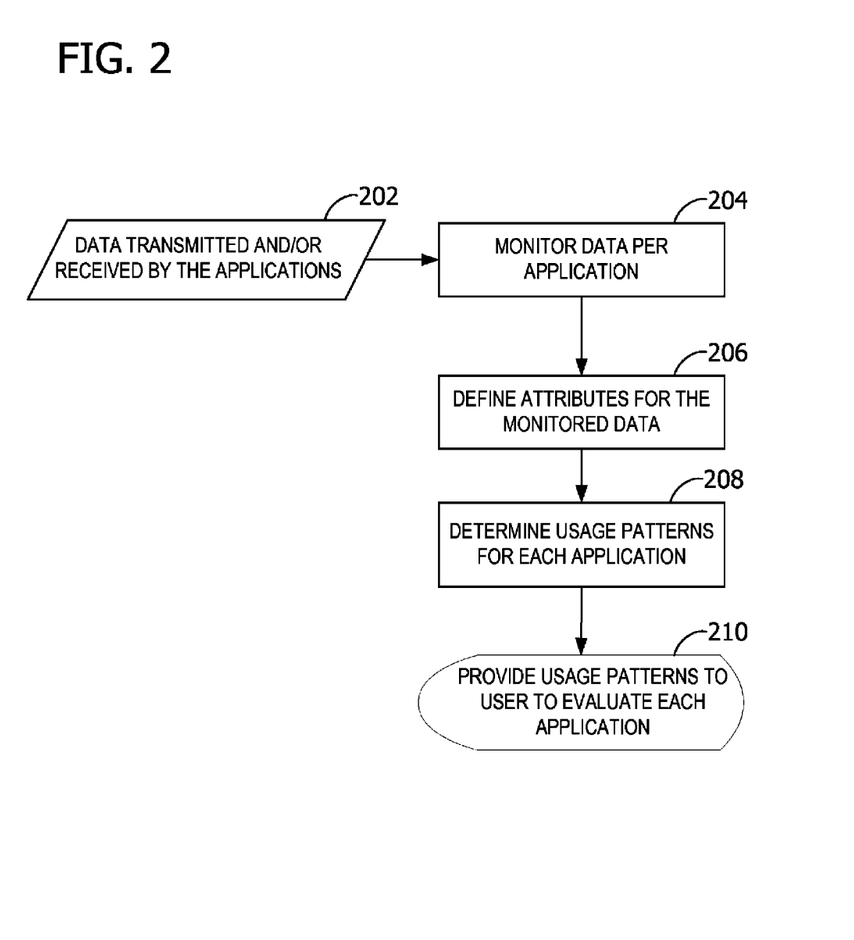
FIG. 2 is an exemplary flow chart illustrating operation of the computing device to monitor data transmitted and/or received by applications executing on the computing device and to develop usage patterns based thereon.

Referring next to FIG. 2, an exemplary flow chart illustrates operation of the computing device 102 to monitor data transmitted and/or received by applications 110 executing on the computing device 102 and to develop usage patterns based thereon. At 202, data is transmitted and/or received by the applications 110. At 204, aspects of the disclosure monitor the data to define, at 206, one or more of the attributes 112. Exemplary attributes 112 include, but are not limited to, a transmission time, receipt time, duration, network interface type, network destination, device battery status, port, location of the computing device 102, network operator, quantity of data sent, quantity of data received, application name, or permissions. In some embodiments, each of the applications 110 has a corresponding set of attribute values. At 208, usage patterns are determined for each of the applications 110. The usage patterns are determined based at least on the monitored data and the defined attributes 112. For example, the usage patterns may identify patterns in the volume and type of data transmitted and/or received, the type of network interface used, times during the day for heavy and light volume, and the like. At 210, the determined usage patterns are provided to the user 104 of the computing device 102. The user 104 analyzes or evaluates each application 110 based on the usage pattern corresponding to that application 110. For example, the usage patterns may be grouped per application 110 such that the user 104 is able to evaluate each of the applications 110 based on the associated usage pattern. In another example, the usage patterns are grouped per attribute 112 such that the user 104 is able to compare each of the applications 110 based on the attribute 112 (e.g., which application 110 uses the cellular radio the most, which application 110 uses a WiFi network adapter the most, etc.).

Aspects of the disclosure may further operate to receive, from the user 104, the data usage limits 116 associated with each of the applications 110. For example, the user 104 may specify a maximum quantity of data to be transmitted and/or received by a particular application 110. The user 104 may also specify the quantity per other attributes 112 such as per time interval (e.g., during peak or business hours versus off-peak or weekend and night hours), per network interface type, or per location of the computing device 102.

In some embodiments, the policies 114 are created based on the defined attributes 112, the received data usage limits 116, user preferences, system preferences, and/or other criteria. Aspects of the disclosure apply the policies 114 to prevent the applications 110 from violating the data usage limits 116 (e.g., exceeding a maximum data usage). The policies 114 apply to one or more of the applications 110. In some embodiments, the policies 114 prioritize a first one of the applications 110 over a second one of the applications 110 such that if remaining data usage is limited, the first application is given priority over the second application to use the remaining data usage. In such embodiments, the data traffic of the second application is restricted, as described below with reference to FIG. 3.

Aspects of the disclosure may further receive, from the user 104, an assignment of at least one of the applications 110 to at least one of a plurality of categories. Example categories include business, leisure, recreation, personal, and private. For example, the business category may include electronic mail programs and calendar programs, while the leisure category may include social networking applications and games. In such embodiments, the usage patterns may be grouped by category such that the user 104 is able to evaluate the data traffic used by each category of the applications 110.

In some embodiments, recommendations may be given based on the determined usage patterns. The recommendation may be provided to the user 104 along with the usage patterns. For example, if aspects of the disclosure determine that a particular program or category of programs is generated an excessive amount of data traffic, that program or category may be identified for deletion. The user 104 is prompted to accept or reject the recommendation.

Figure 3:
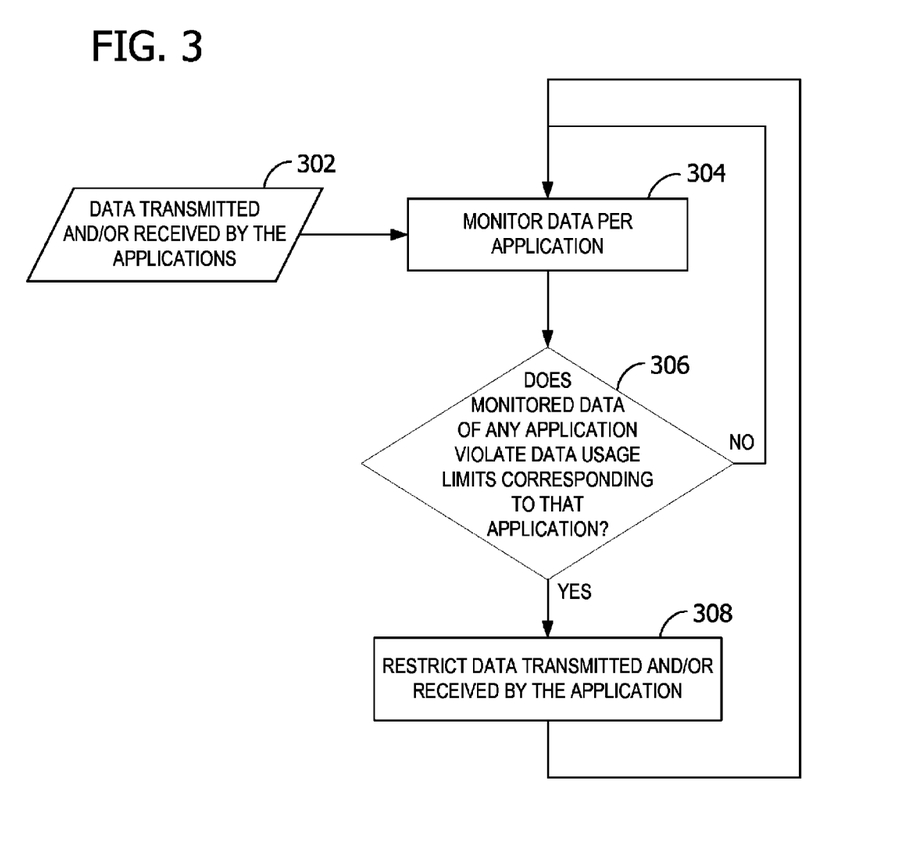
FIG. 3 is an exemplary flow chart illustrating operation of the computing device to restrict data transmitted and/or received by applications executing on the computing device.

Referring next to FIG. 3, an exemplary flow chart illustrates operation of the computing device 102 to restrict data transmitted and/or received by applications 110 executing on the computing device 102. At 302, data is transmitted and/or received by the applications 110. At 304, aspects of the disclosure monitor the transmitted and/or received data per application 110. At 306, the monitored data of each application 110 is compared with the corresponding data usage limits 116 for that application 110 to determine whether the data usage limits 116 have been violated (or are about to be violated). If no violation or trigger has occurred, the data continues to be monitored at 304. If a violation or trigger has occurred, the application 110 associated with the violation is restricted from transmitting and/or receiving additional data. For example, limits may be placed on how much data may be transmitted and/or received during certain periods of the day (e.g., during peak hours). In another example, the application 110 may be automatically blocked from transmitting and/or receiving any data (e.g., download of a web page may be halted when the threshold is reached). In still another example, the user 104 is prompted to manually consent to or reject a recommendation to restrict the data traffic of a particular application 110.

While the restriction at 308 affects the application 110 deemed to be in violation of the data usage limits 116, other applications 110 may continue to transmit and/or receive data. As such, the monitoring continues at 304.

Figure 4:
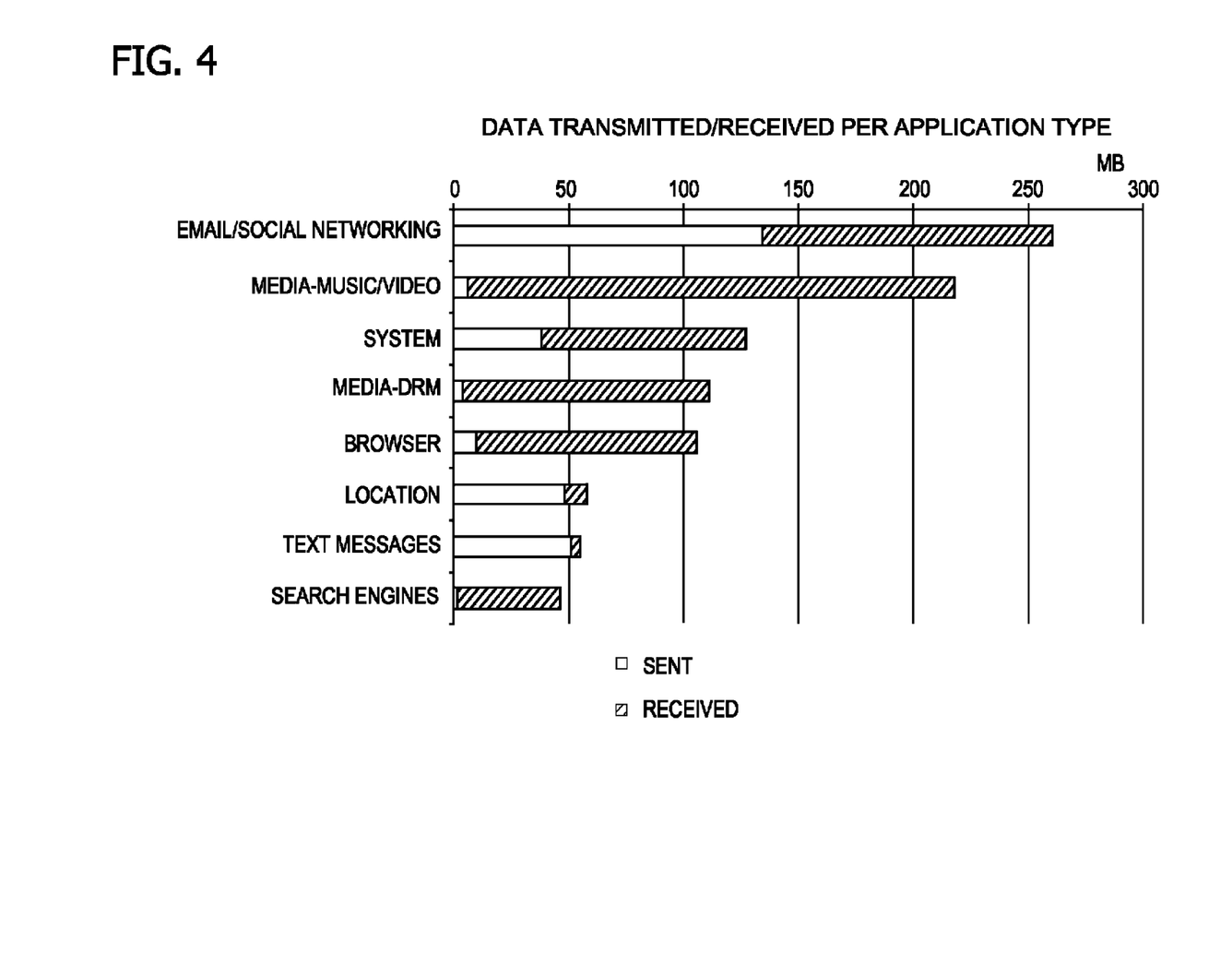
FIG. 4 is an exemplary diagram illustrating data transmitted and received per application type.

Referring next to FIG. 4, an exemplary diagram illustrates data transmitted and received per application type. The values represented by the diagram are generated by aspects of the disclosure (e.g., the report component 124). In the example of FIG. 4, the vertical axis lists the application types including email/social networking applications, multimedia applications, operating system applications, digital rights management applications, browsers, applications using location-based services, text messaging applications, and search engines. The horizontal axis represents the total quantity of data traffic sent and/or received by each type or category of application 110. The cross-hatching indicates the division between the amount of data sent versus the amount of data received by each type of application 110.

Additional Examples

Listed below is an example policy designed for users in a corporate environment. The example policy considers applications in use, roaming status, byte budgets (e.g., by percentage and absolute), and network interface types. The example policy also provides criteria for prompting the user to override restrictions as budgets are approached.

```
<budget>
    <policy Cellular>
        <Program ID=EMAIL, Limit=500MB, Send=100MB, Roaming=YES>
        <Program ID=SocialNetworkingSiteA, Limit=10MB>
        <Program ID=DEF, Limit=10MB, Roaming=NO>
        <PromptReminder Criteria=Bytes, PercentofBudget=50%>
        <PromptData Criteria=Bytes, PercentofBudget=90%>
        <PromptData Criteria=Roaming, Limit=20MB>
    </policy>
    <policy WiFi>
        <Program ID=XYZ, Limit=5000MB>
        <Program ID=ABC, Limit=5000MB>
    </policy>
</budget>
```

In an example scenario, an employee is provided with an employer-sponsored mobile telephone. At the time of configuration, a corporate usage policy may be installed to ensure that the mobile operator costs will be in line with employer policy. There may be different policies 114 for different employees based on the level of the employee, type of mobile telephone, and level of sponsorship. The data usage limits 116 may appear as reminders to the employee or may be more automatically restrictive based on allowable budget.

In another example, the user is about to visit another country but is concerned about roaming network charges. A policy may be generated based on her home mobile operator, employer, peer group, or other context. The policy is based on financial amounts and applications or types of applications the user plans to use while roaming. For example, web search engines and location-based service may be able to send and/or receive data without data usage limits 116 up to a predefined maximum financial amount (e.g., $50). In contrast, social networking applications are only able to send and/or receive data using a WiFi network connection to ensure that costs are not accidentally incurred while roaming.

In still another example, a salesperson on commission wants to track the business-related costs of using a mobile telephone. Using aspects of the disclosure, the salesperson can identify the quantity of data sent and/or received by business applications. The salesperson is then able to bill an employer for that identified quantity. The salesperson is also able to identify which personal or leisure applications are incurring costs during working hours. On the employer side, the employer can access aspects of the invention to confirm the identified quantity of data based on centralized monitoring of the data traffic.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for determining a quantity of data transmitted and/or received by each of the plurality of applications 110, and exemplary means for defining and applying a policy 114 for managing data traffic per application 110.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for managing data traffic per application, said system comprising:
   a memory area associated with a mobile computing device, said memory area storing a profile of a user, said profile including data usage limits corresponding to a plurality of application types and to each of a plurality of applications installed and executing on the mobile computing device, one or more of the plurality of applications being assigned to one of the plurality of the application types; and
   a processor programmed to:
      provide the profile of the user and usage habits of the mobile computing device to another computing device, wherein the profile includes at least a list of the installed applications and the data usage limits corresponding to each application in the list of installed applications;
      receive one or more data usage policies from the another computing device, wherein the another computing device selects the one or more data usage policies based on a plurality of profiles received from a plurality of mobile computing devices, wherein each of the data usage policies has the data usage limits corresponding to the application types and to at least one of the plurality of applications executing on the mobile computing device, wherein the another computing device provides one or more of the plurality of mobile computing devices having similar usage habits with the same data usage policies;

provide the received data usage policies to the user in a user interface;

receive, from the user of the mobile computing device, a selection of one of the received data usage policies;

apply a restriction on data transmitted and/or received by each of the plurality of applications and each of the plurality of application types based on the selected data usage policy; and responsive to applying the restriction, prioritize a first one of the plurality of applications over a second one of the plurality of applications for transmitting and/or receiving data in excess of the data usage limits.

2. The system of claim 1, wherein the processor is programmed to restrict the data transmitted and/or received by halting download of a web page by the mobile computing device.

3. The system of claim 1, wherein the processor is programmed to receive the data usage limits for storage in the memory area.

4. The system of claim 1, wherein the processor is further programmed to prompt, when monitored data exceeds the corresponding data usage limit for one of the plurality of applications, a user of the mobile computing device for consent to restrict the data transmitted and/or received by said one of the plurality of applications.

5. The system of claim 1, wherein the processor is further programmed to determine a quantity of the data transmitted and/or received by each of the plurality of applications.

6. The system of claim 1, wherein the processor is further programmed to define and apply a policy for managing data traffic per application for each of the plurality of applications.

7. A method comprising:

providing a profile of a user and usage habits of a first computing device to a second computing device, wherein the profile includes at least a list of installed applications and data usage limits corresponding to each application in the list of installed applications, the profile including data usage limits corresponding to a plurality of application types;

receiving one or more data usage policies from the second computing device, wherein the second computing device selects the one or more data usage policies based on a plurality of profiles received from a plurality of first computing devices, wherein each of the data usage policies has the data usage limits each corresponding to the plurality of application types and to at least one of the applications executing on the first computing device, wherein the second computing device provides one or more of the plurality of first computing devices having similar usage habits with the same data usage policies;

providing the received data usage policies to the user in a user interface;

receiving, from the user of the first computing device, a selection of at least one of the received data usage policies;

applying a restriction on data transmitted and/or received by each application in the list of installed applications and each of the plurality of application types based on the selected data usage policy; and in response to applying the restriction, prioritizing a first application in the list of installed applications over a second application in the list of installed applications for transmitting and/or receiving data in excess of the data usage limits.

8. The method of claim 7, further comprising:

monitoring data transmitted and/or received by each application, in the list of installed applications, executing on the first computing device;

defining attributes associated with the monitored data for each application in the list of installed applications;

defining a policy based on the defined attributes and the data usage limits; and applying the defined policy to prevent each application in the list of installed applications from exceeding the data usage limits associated therewith.

9. The method of claim 8, further comprising:

determining usage patterns for each application in the list of installed applications based at least on the monitored data and the defined attributes associated therewith; and providing the determined usage patterns to the user.

10. The method of claim 8, further comprising providing the defined policy to another computing device, wherein the another computing device applies the defined policy to a plurality of applications executing on the another computing device.

11. The method of claim 8, wherein defining the one or more attributes comprises defining one or more of the following: transmission time, receipt time, duration, network interface type, port, location of the computing device, network operator, quantity of data sent, quantity of data received, application name, and permissions.

12. The method of claim 9, wherein providing the determined usage patterns to the user comprises providing the determined usage patterns grouped per application, wherein the user evaluates each application in the list of installed applications based on the determined usage patterns associated therewith.

13. The method of claim 9, wherein providing the determined usage patterns to the user comprises providing the determined usage patterns grouped per defined attribute, wherein the user evaluates each application in the list of installed applications based on the defined attribute.

14. The method of claim 9, further comprising receiving, from the user, an assignment of one or more of the list of installed applications to at least one of a plurality of application categories, and wherein the user evaluates the plurality of application categories based on the determined usage patterns.

15. The method of claim 14, wherein receiving the assignment comprises receiving an assignment of one or more of the list of installed applications to one or more of the following application categories: business, leisure, recreation, personal, and private.

16. The method of claim 7, further comprising generating recommendations restricting the data transmitted and/or received by each application in the list of installed applications, wherein one of the recommendations comprises deletion of at least one application in the list of installed applications when the data transmitted and/or received for said at least one application in the list of installed applications is in excess of a threshold.

17. One or more computer storage media storing computer-executable components, said components comprising:

a communications interface component that when executed by at least one processor of a first computing device of a plurality of computing devices causes the at least one processor to:

provide a profile of a user and usage habits of the first computing device to a second computing device, wherein the profile includes at least a list of installed applications and data usage limits corresponding to each application in the list of installed applications, and receive one or more data usage policies from the second computing device, wherein the second computing device selects the one or more data usage policies based on a plurality of profiles received from two or more of the plurality of computing devices, wherein each of the data usage policies have data usage limits each corresponding to application types and at least one of a plurality of applications executing on the first computing device, wherein the second computing device provides one or more of the plurality of computing devices having similar usage habits with the same data usage policies;

a user interface component that when executed by at least one processor of the first computing device causes the at least one processor to:

provide the data usage policies received by the communications interface component to the user, and receive from the user a selection of at least one of the provided data usage policies; and a restrictor component that when executed by at least one processor of the first computing device causes the at least one processor to apply the data usage policy, selected by the user via the user interface component, to the application types and one or more of the plurality of applications executing on the first computing device, wherein in response to applying the data usage policy, a first application is prioritized, for transmitting and/or receiving data in excess of the data usage limits, over a second application from the list of installed applications included in the profile of the user.

18. The computer storage media of claim 17, wherein the restrictor component executes to apply the data usage policy by restricting data transmitted and/or received by at least one of the plurality of applications if the data usage limits for said at least one of the plurality of applications have been exceeded.

19. The computer storage media of claim 17, wherein the user interface component further executes to receive, from the user, an exception list of applications to which the data usage policies do not apply.

20. The computer storage media of claim 17, further comprising a report component that when executed by at least one processor of the first computing device causes the at least one processor to provide the user with a resource cost and a data cost associated with each of the plurality of applications, the resource cost corresponding to an amount of battery power consumed when transmitting and/or receiving data.

* * * * *